(12) United States Patent
Oren et al.

(10) Patent No.: US 8,108,834 B2
(45) Date of Patent: Jan. 31, 2012

(54) DEFINING AND EXECUTING PROCESSES USING DECLARATIVE PROGRAMMING LANGUAGE CONSTRUCTS

(75) Inventors: David Oren, Haifa (IL); Gal Shachor, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 11/688,904

(22) Filed: Mar. 21, 2007

(65) Prior Publication Data

US 2008/0235682 A1    Sep. 25, 2008

(51) Int. Cl.
G06F 9/44 (2006.01)

(52) U.S. Cl. ......... 717/117; 717/114; 717/120; 717/121

(58) Field of Classification Search ............... 717/104, 717/114, 117; 709/204
See application file for complete search history.

(56) References Cited

U.S. PATENT DOCUMENTS

| | | | | |
|---|---|---|---|---|
| 5,734,837 | A * | 3/1998 | Flores et al. | 705/7 |
| 7,437,710 | B2 * | 10/2008 | Bau et al. | 717/117 |
| 7,444,622 | B2 * | 10/2008 | Grieskamp et al. | 717/124 |
| 7,627,631 | B2 * | 12/2009 | Blevins | 709/205 |
| 7,739,290 | B2 * | 6/2010 | Rossmann | 707/755 |
| 2003/0023679 | A1 * | 1/2003 | Johnson et al. | 709/204 |
| 2003/0093471 | A1 * | 5/2003 | Upton | 709/203 |
| 2005/0065903 | A1 * | 3/2005 | Zhang et al. | 707/1 |
| 2005/0149342 | A1 * | 7/2005 | Chao et al. | 705/1 |
| 2006/0143597 | A1 * | 6/2006 | Alaluf et al. | 717/136 |
| 2006/0155562 | A1 * | 7/2006 | Kano et al. | 705/1 |
| 2006/0174222 | A1 * | 8/2006 | Thonse et al. | 717/106 |
| 2006/0206348 | A1 * | 9/2006 | Chen et al. | 705/1 |
| 2007/0169199 | A1 * | 7/2007 | Quinnell et al. | 726/25 |
| 2007/0174185 | A1 * | 7/2007 | McGoveran | 705/39 |
| 2007/0192352 | A1 * | 8/2007 | Levy | 707/102 |

OTHER PUBLICATIONS

Kahan et al., "Annotea: An Open RDF Infrastructure for Shared Web Annotations", ACM, May 2001, pp. 623-632.*
Johnson R et al., "The Spring Framework—Reference Documentation," version 2.0.2, Interface21, available at http://www.springframework.org/docs/reference/index.html.
Yun Lin et al., "Semantic annotation framework to manage semantic heterogeneity of process models", *Advanced Information Systems Engineering. 18th International Conference, CAiSE 2006. Proceedings* (Lecture Notes in Computer Science vol. 4001), 2006, 433-46.
M.A. Aslam et al, "Expressing business process models as OWL-S ontologies", *Business Process Management Workshops. BPM 2006 International Workshops, BPD, BPI, ENEI, GPWW, DPM, semantics4ws. Proceedings* (Lecture Notes in Computer Science vol. 4103), 2006, 400-15.

(Continued)

*Primary Examiner* — Emerson Puente
*Assistant Examiner* — Charles Swift (57) ABSTRACT

A computer-implemented technique for executing a process is provided. The technique includes providing a class having at least one annotation that defines at least a portion of the process. The annotation is a run-time-readable, non-executable declarative programming construct that is associated with a first method of the class, and specifies at least one transition rule and a second method of the class associated with the transition rule. A process engine, which runs on a computer and is not an instance of the class, parses the annotation to extract the transition rule. The process engine receives a message from a source external to the process engine, and evaluates whether the transition rule is satisfied, responsively to the message. Upon finding that the transition rule is satisfied, the process engine invokes the second method, so as to generate an output with respect to the message. Other embodiments are also described.

20 Claims, 2 Drawing Sheets

OTHER PUBLICATIONS

B. Weber et al., "Towards a framework for the agile mining of business processes", *Business Process Management Workshops. BPM 2005 International Workshops BPI, BPD, ENEI, BPRM, WSCOBPM, BPS. Revised Selected Papers* (*Lecture Notes in Computer Science* vol. 3812), 2005, 191-202.

\* cited by examiner

DEFINING AND EXECUTING PROCESSES USING DECLARATIVE PROGRAMMING LANGUAGE CONSTRUCTS

COPYRIGHT NOTICE

Program listings in the disclosure of this patent document contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to transaction management, and specifically to process definition and execution.

BACKGROUND OF THE INVENTION

Businesses define and execute business processes. In the context of the present patent application and in the claims, a "process" is defined as a set of activities, also known in the art as tasks, together with transitions among these activities. The transitions are subject to constraints on execution order, also referred to as the "control flow." Business processes are often complex, and include user interactions, interactions with distributed services, and complex conditional control flow. Processes are often defined by states of a state machine, and/or a collection of activities with transitions between them. Workflow management is one type of process management.

Dedicated languages have been developed to model business processes. Business Process Execution Language (BPEL) is one such language that is currently widely used. BPEL is an XML-based language that allows a business process developer to define business processes, including interactions with external entities, and control flow, such as branching and looping within a process. A business process engine parses BPEL definition files to execute the processes defined by the files. The complexity of business process languages such as BPEL has driven the development of business process definition GUI tools that allow developers to construct business processes graphically.

Johnson R et al., in "The Spring Framework-Reference Documentation," version 2.0.2, Interface21, available on the Internet, describe the Spring Framework. This framework is an open-source Java/J2EE application framework that includes JavaBeans-based configuration, an Aspect-Oriented Programming (AOP) framework, declarative transaction management, Java Database Connectivity (JDBC) and Hibernate support, and a web Model-View-Controller (MVC) framework. Chapter 9.5 describes Spring's implementation of declarative transaction management, which includes the use of a @Transactional annotation. The @Transactional annotation is metadata that can be consumed by something that is @Transactional-aware and that can use the metadata to configure the appropriate beans with transactional behavior.

JBoss jBPM, distributed by JBoss, a division of Red Hat, Inc. (Raleigh, N.C.), is an extensible workflow management system that enables the creation of business processes that coordinate between people, applications and services. jBPM is a platform for multiple process languages, which supports workflow, business process management (BPM), and process orchestration. jBPM currently supports two process languages: (1) jPDL, which is a process language to implement BPM and workflow in Java that combines human task management with workflow process constructs that can be built in Java applications, and (2) BPEL, which provides process orchestration.

SUMMARY OF THE INVENTION

A computer-implemented technique for executing a process is provided in accordance with an embodiment of the present invention. The technique includes providing a class having at least one annotation that defines at least a portion of the process. The annotation is a run-time-readable, non-executable declarative programming construct that is associated with a first method of the class, and specifies at least one transition rule and a second method of the class associated with the transition rule. A process engine, which runs on a computer and is not an instance of the class, parses the annotation to extract the transition rule. The process engine receives a message from a source external to the process engine, and evaluates whether the transition rule is satisfied, responsively to the message. Upon finding that the transition rule is satisfied, the process engine invokes the second method, so as to generate an output with respect to the message.

An apparatus is further provided for executing the process, in accordance with an embodiment of the present invention. The apparatus includes a process management server that includes an input interface and a processor that implements the process engine.

A computer software product is additionally provided for executing the process, in accordance with an embodiment of the present invention. The product includes a tangible computer-readable medium in which program instructions are stored, which instructions, when read by a computer, cause the computer to implement the process engine.

The present invention will be more fully understood from the following detailed description of embodiments thereof, taken together with the drawings, in which:

DETAILED DESCRIPTION OF EMBODIMENTS

Overview

Although the development of business process languages has been motivated in part to simplify the task of business process definition, this goal has not been consistently achieved. The use of a dedicated language to define business processes often creates overhead in business process development organizations, because developers must learn a new language having a new set of abstractions, syntax, and definitions. For many simple business processes used today, the use of BPEL increases rather than reduces complexity. Moreover, organizations must develop an advanced infrastructure to support the many constructs provided by BPEL, further increasing complexity.

Current process definition languages generally include the following capabilities:

the definition of activities/states that construct the business process;

the definition of transitions between the activities/states. Such definition typically includes conditional execution, the usage of branching and looping, and possible transitions;

interactions with the external world, which includes the definition of "partner links" (as defined, for example, by BPEL), the definition of messages to be sent to partners, including their schema and content, and invocation of partners through invocation activities;

conditional execution within activities;

execution of scripting sections for some activities; and the definition of local variables to be used throughout the business process.

In embodiments of the present invention, software annotations are used to define process abstractions and control program behavior. A process engine is provided with a class having one or more annotations that together define a process. The process engine parses each of the annotations to determine one or more transition rules. The process engine executes the process by evaluating whether the transition rules are satisfied, and invoking methods specified by the evaluated transition rules. The annotations typically specify that the engine evaluate certain of the transition rules after the engine receives external messages associated with the rules.

Each transition rule includes an activity, and optionally includes one or more predicates and/or an interaction names. The activity specifies a method of the class to be called by the engine upon satisfaction of the transition rule. The transition rule is satisfied upon satisfaction of all predicates and interaction names that are provided, or, by default, if neither predicates nor interaction names are provided. Each predicate specifies a condition that is typically evaluated by calling a specified method of the class. Each interaction name is satisfied if the name matches a descriptive name provided in an external message received by the process engine.

The process engine and process classes are typically implemented using a conventional, non-proprietary programming language, such as Java™ (Sun Microsystems, Inc., Santa Clara, Calif.). The techniques described herein thus obviate the need to learn and deploy a special-purpose process language, such as BPEL. The use of a non-proprietary programming language also allows for easier testing and debugging using a variety of commercially-available development environments.

For some applications, the process rules include business process rules, and the process engine comprises a business process engine, which may be implemented, for example, in an environment that deploys WebSphere® systems and applications, which are distributed by IBM Corp. (Armonk, N.Y.).

For some applications, the process engine processes business transactions. Such transactions may be atomic, in which case the process typically locks external resources for the duration of the transaction. Alternatively, such transactions may be long-running, i.e., they represent a business activity. In the latter case, the process engine does not lock external resources during the transaction, and undo activities are provided for undoing transactions that are not completed.

System Description

Figure 1:
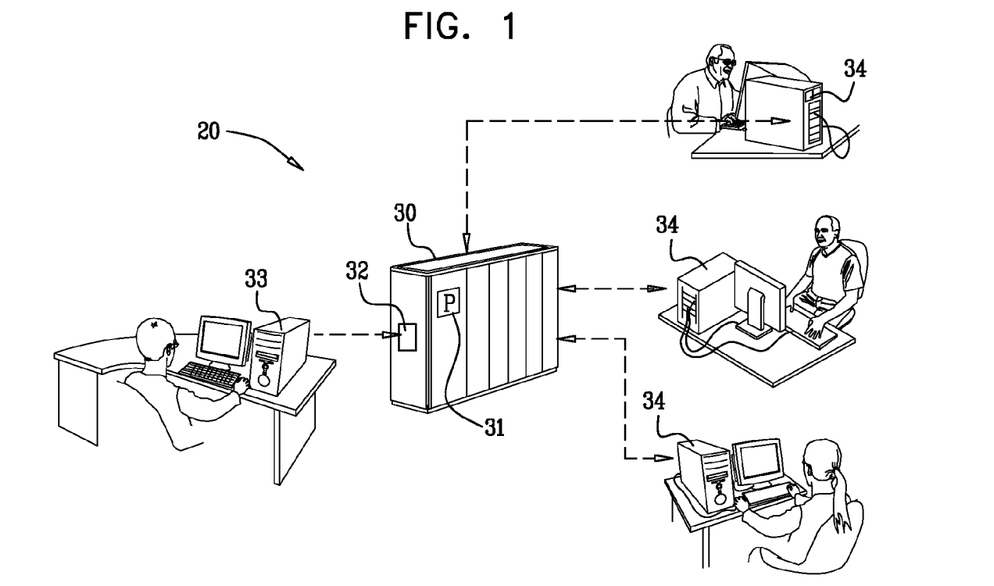
FIG. 1 is a schematic, pictorial illustration showing a transaction environment for process management, in accordance with an embodiment of the present invention.

FIG. 1 is a schematic, pictorial illustration showing a transaction environment 20 for process management, in accordance with an embodiment of the present invention. Environment 20 includes a process management server 30. Process management server 30 comprises at least one processor 31, and at least one input/output interface 32 that is configured to receive input from at least one application server 33, such as a Web application server, over a local area network (LAN) and/or wide area network (WAN), such as the Internet. During execution of a process, process management server 30 exchanges messages with one or more sources 34 external to server 30, such as workstations, servers, or clients, over a LAN and/or WAN.

Process management server 30 typically comprises a general-purpose computer workstation, having a processor, and, optionally, a user interface. Software for carrying out the process management functions of process management server 30 may be provided to the server in electronic form, over a network, for example, or it may alternatively be furnished on tangible media, such as optical, magnetic or electronic memory media.

Figure 2:
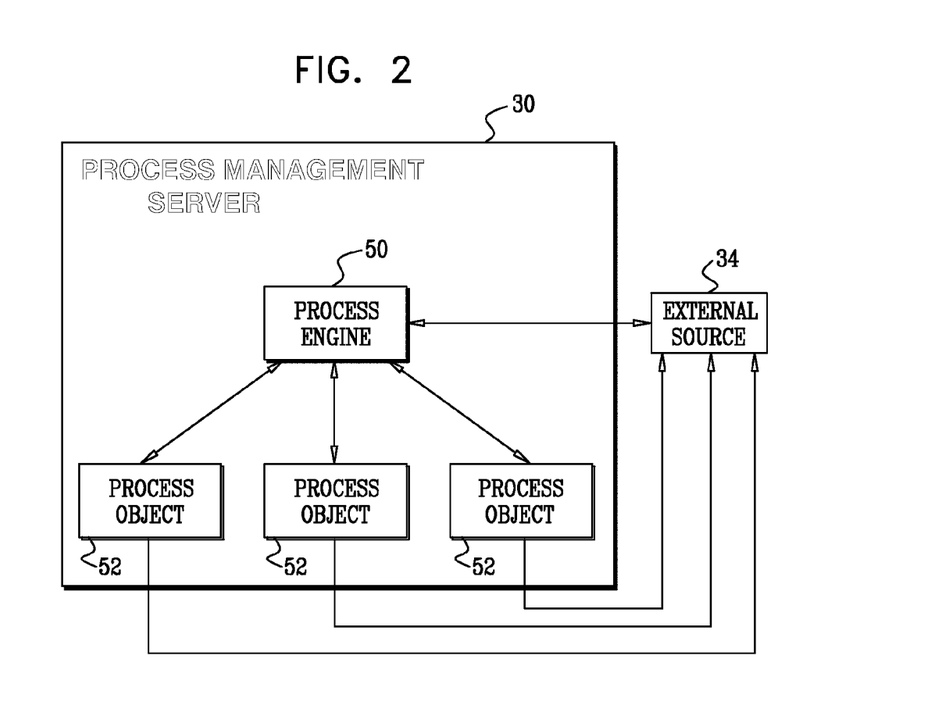
FIG. 2 is a block diagram that schematically illustrates software components of a process management server operating in the transaction environment of FIG. 1, in accordance with an embodiment of the present invention.

FIG. 2 is a block diagram that schematically illustrates software components of process management server 30, in accordance with an embodiment of the present invention. Process management server 30 implements a process engine 50. The process engine is a program that executes processes, including evaluating transitions and controlling flow, by interacting with process objects 52. Each process object is an instance of a respective process class. For some applications, the process object is instantiated by process engine 50 (such as upon receiving a message requesting instantiation of a new process object), while for other application, the process object is instantiated and passed to the process engine by a process outside of the process engine. It will be recognized by those skilled in the art that process objects 52 and their respective process classes may be stored in memory and/or other storage of process management server 30, or stored and accessed remotely by process engine 50.

Process engine 50 and process objects 52 are typically implemented using a conventional, non-proprietary programming language, including object-oriented programming languages such as Java or C++, and programming languages such as C, LISP, Ruby, Python, or PHP. Although the examples provided hereinbelow are implemented in Java, it will be appreciated by those skilled in the art that the techniques of the present invention can be readily implemented using other programming languages.

Each of the process classes has one or more annotations that together define a process. Process engine 50 parses each of the annotations to determine one or more transition rules, or states, such as an initial state or an end state. Annotations allow a programming language to associate declarative metadata with language artifacts such as classes and methods. Some languages, such as Java, Python, and PHP, provide direct support for annotations. In other languages, such as LISP and Ruby, annotations can be defined as a macro or Meta Object Protocol (MOP) manipulation. In the context of the present application, including the claims, an "annotation" is defined as a run-time-readable declarative programming that is associated with a program element. An annotation is not executable, i.e., is not a statement or procedural step in a programming language that calls for processing action by a computer running the program including the annotation. A "class" is to be understood broadly to include any programming structure that defines properties of an object and methods used to control the object's behavior.

Reference is made to Listing 1 of Appendix A hereinbelow, which lists several Java annotation declarations used by process engine 50, in accordance with an embodiment of the present invention. It will be appreciated that these are exemplary declarations only; annotations having different names, and/or using different syntax and/or element names are within the scope of the present invention.

The @Process annotation is a class annotation that specifies that the annotated class defines a process, and optionally assigns the process a descriptive name.

The @Initial annotation is a method annotation that specifies that the annotated method is to be called in an initial state of the process defined by the process class, i.e., that process engine 50 should call the method upon beginning the process. Each process class typically has a single @Initial method.

The @Final annotation is a method annotation that specifies that the annotated method terminates the process defined by the process class. A process class may specify a plurality of @Final methods. Any process-related methods within a process class are by default @Final if no transitions are specified. (A method within a process class is considered to be process-related if the method is specified as an activity by at least one transition rule.)

The @Transition annotation is a method annotation that specifies a single transition rule for a transition from the annotated method. The transition rule includes an activity, an optional predicate, and an optional interaction name. The activity specifies the name of the method to be called by process engine 50 upon satisfaction of the transition rule. Typically, the method to be called is defined in the same process class as the method annotated with the transition rule. Alternatively, the method to be called is defined in another class. The transition rule is satisfied upon satisfaction of all predicates and interaction names that are provided, or, by default, if neither predicates nor interaction names are provided. Each predicate specifies a condition, which typically is evaluated by a calling the method having the name specified by the predicate. The specified method returns a boolean value. Alternatively, the predicate is an expression that is evaluated at run time by the process engine. The interaction name specifies a descriptive name provided in an external message received by process engine 50 from one of external sources 34 (FIG. 1), as described hereinbelow with reference to FIG. 3.

The @Transitions (in the plural) annotation is a method annotation that aggregates a plurality of transition rules, each of which is specified by a respective @Transition (in the singular) annotation. As described hereinbelow with reference to FIG. 3, process engine 50 typically evaluates each of the transition rules in the order they are listed, and invokes the transition specified by the first rule that is found to be satisfied. The @Transitions annotation further includes a boolean wait element, that specifies whether process engine 50 should wait to receive a message from an external process before evaluating the transition rules listed in the annotation. The default value for the wait element is typically true.

For some applications, a method is directly annotated with an @Transition (in the singular) annotation, rather than with an @Transitions (in the plural) annotation that includes one or more @Transition annotations.

The @Activity annotation is a method annotation that explicitly indicates that the annotated method implements an activity of the process, and can thus serve as a target of a transition. The use of this annotation is optional.

Reference is made to Listing 2 of Appendix A hereinbelow, which is a code listing showing an exemplary process class implemented in Java, in accordance with an embodiment of the present invention. The process class defines a simple order approval process. Portions of this class are described hereinbelow with reference to certain steps of the method of FIG. 3.

Figure 3:
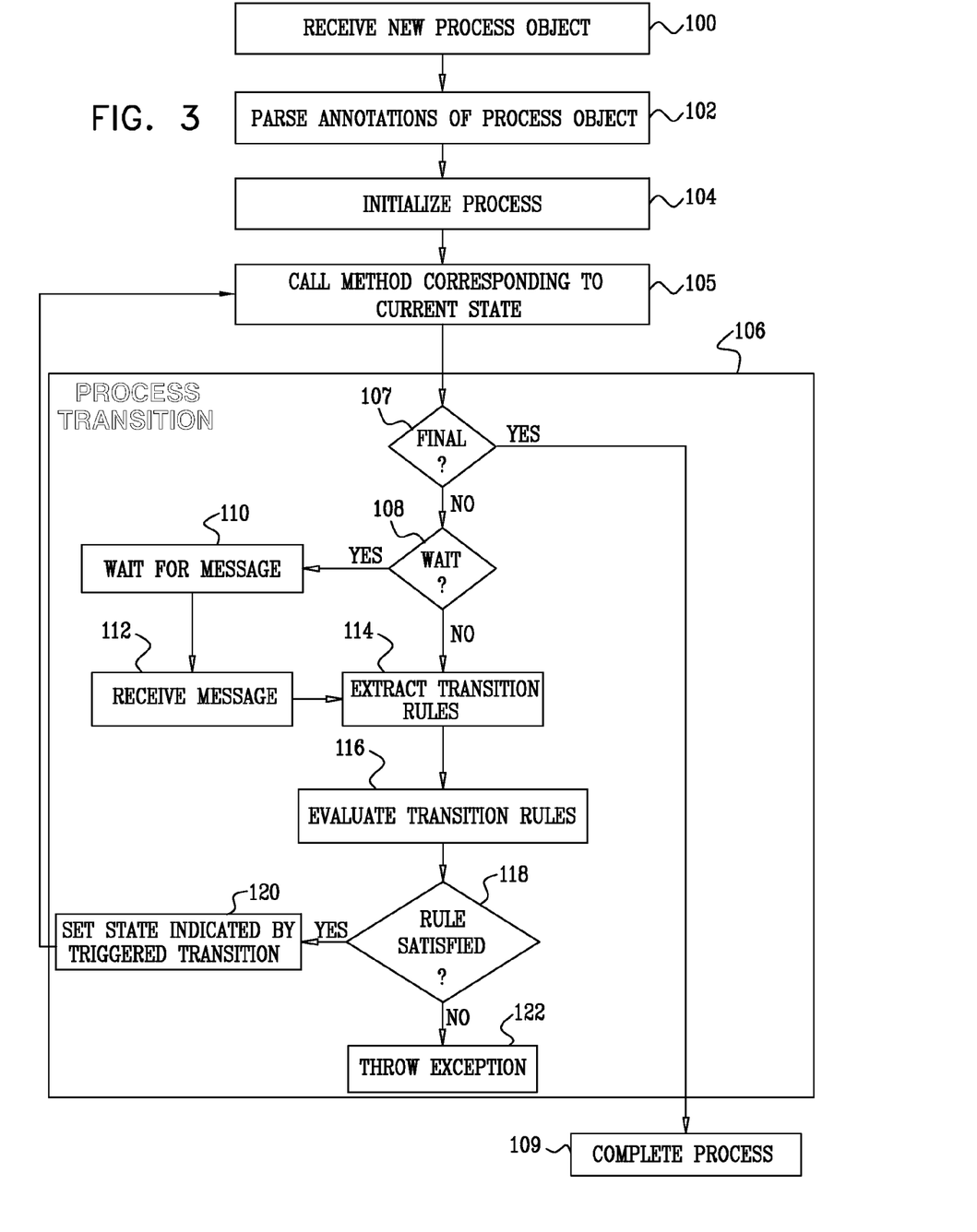
FIG. 3 is a flow chart that schematically illustrates a method for executing a process, in accordance with an embodiment of the present invention.

Reference is made to FIG. 3, which is a flow chart that schematically illustrates a method for executing a process, in accordance with an embodiment of the present invention. Process engine 50 performs this method separately for each process object 52. Process engine 50 typically is configured to process a plurality of processes concurrently. To accomplish this, the process engine keeps track of the current state of each process separately, using appropriate data structures that will be evident to those skilled in the art.

The method of FIG. 3 begins upon the receipt of a new process object 52 by process engine 50, or a request to create a new process object, at a new process object receipt step 100. As mentioned above, for some applications, the process object is instantiated by process engine 50, while for other applications, the process object is instantiated and passed to the process engine by a process outside of the process engine.

At an annotations parse step 102, process engine 50 reads the annotations of process object 52, typically at run time. For implementations of process management server 30 in languages that support run-time reflection, such as Java, the process engine typically reads the annotations using reflection. For example, for Java implementations, the process engine may get a reference to the Class object of process object 52, and use the Class object to get the annotations of the process class of which process object 52 is an instance. The process engine confirms that the process class is annotated with @Process. The process engine parses the method annotations, to determine which methods are associated with which annotations, and to confirm the presence of all methods referred to within @Transition annotations. For example, such parsing may utilize the Java code of Listing 3 of Appendix A, as described hereinbelow. As mentioned above, an @Final annotation is assumed for non-annotated methods that define process elements. Alternatively, process engine parses all or a portion of the annotations during execution of the process at transition processing step 106, described hereinbelow.

At a process initialization step 104, process engine 50 creates a new process represented by the class of process object 52. The process engine sets a current state of the process to an initial state. It is noted that for applications in which the process object is instantiated by a process external to process engine 50, the constructor of process object 52 is called at instantiation time by the external process, and thus cannot be used by process engine 50 for process-related initialization. In embodiments in which process engine 50 operates in an environment having a larger context, the engine typically injects this context into process object 52, such as by calling a designated method of the object and passing the method an object representing the context. In the example illustrated in Listing 2 of Appendix A, process engine 50 calls the setContext method, and passes it a BPCContext object. For some applications, process engine 50 does not begin execution of the process until receiving an explicit command from a user or external process to do so.

Process engine 50 calls the method corresponding to the current state, at a method call step 105. If the current state is the initial state, the process engine calls the method annotated with @Initial. In the example illustrated in Listing 2 of Appendix A, the requestInitiated method is annotated with @Initial, and is thus executed in the initial state. Typically, at least one of the methods of the process class generates an output with respect to the process. For example, the methods may send messages to one or more sources 34 (FIG. 1), write to a storage device (e.g., a disk or other storage medium), or display the output on a user interface, such as a screen. For some applications, such messages invoke a service provided by the external source.

Upon completion of execution of the method called at step 105, process engine 50 processes the @Transitions annotation of the called method, at a transition processing step 106. Process engine 50 begins transition processing step 106 by evaluating whether the called method is annotated with @Final (or is implicitly @Final, as described hereinabove), at a final check step 107. If process engine 50 finds at step 107 that the method is annotated with @Final, the process engine completes the process, at a process completion step 109. The process engine deletes process object 52. In the example illustrated in Listing 2 of Appendix A, the methods rejected, informUser, and supplyItem are annotated with @Final.

If, on the other hand, the process engine finds that the method is not marked as final, the process engine evaluates whether the wait element of @Transitions is set to true, at a wait check step 108. If the wait element is set to true, at a wait for message step 110, process engine 50 waits until the process engine receives a message relating to the process represented by process object 52, at a receive message step 112. The message includes: (a) a descriptive name, which is used for evaluating one or more transition rules, as described hereinbelow at step 116, (b) an optional payload, as described hereinbelow at step 120, and (c) an ID of the process to which the message refers, which is used by the process engine to match the received message with the appropriate process. For some applications, the message comprises an object, while for other applications, the message comprises another data structure, such as a text string or file. The process engine extracts the descriptive name, payload, and ID from the message. For some applications, process engine 50, instead of itself waiting for a message, returns control to an external process that called the process engine. The external process notifies the process engine once the message has been received by the external process, and passes the descriptive name, payload, and ID of the process to the process engine.

After receiving the message at step 110, or directly after step 108 if the wait element is set to false, process engine 50 extracts the one or more @Transition (in the singular) annotations from the @Transitions (in the plural) annotation currently being processed, at an extract transition rules step 114. At an evaluate transition rules step 116, process engine 50 evaluates the extracted transition rules, typically in the order they are listed in the @Transitions annotation. In the example illustrated in Listing 2 of Appendix A, the @Transitions annotation of the waitForFirstApproval method includes four @Transition annotations.

As mentioned above, each transition rule includes an optional predicate, and an optional interaction name. The transition rule is triggered upon satisfaction of all predicates and interaction names that are provided, or, by default, if neither predicates nor interaction names are provided. @Transitions annotations having a "true" wait element often include, at the end of the list of @Transition annotations, one @Transition that specifies no predicates or interaction names, and thus serves as a default transition that is always triggered if no other specified @Transition is triggered. In the example illustrated in Listing 2 of Appendix A, the last @Transition of the @Transitions annotation of the waitForFirstApproval method specifies no predicates or interaction names, and thus is triggered if none of the three preceding @Transition annotations is triggered.

A predicate specifies the name of a method that returns a boolean value. The method is typically provided in process object 52, but may also be provided in another object or class. Process engine 50 calls the specified method, and considers the predicate satisfied if the method returns the value "true." Alternatively, the predicate is an expression (e.g., a boolean expression) that is evaluated at run time by the process engine. In the example illustrated in Listing 2 of Appendix A, the first @Transition of the @Transitions annotation of the waitForFirstApproval method includes the predicate "inexpensive." In order to evaluate whether this predicate is satisfied, process engine 50 calls the "inexpensive" method (i.e., the method having the name assigned to the predicate). If the inexpensive method returns a "true" value, the predicate is satisfied. Alternatively, the method returns a non-boolean value, and the process engine evaluates the value to determine whether the predicate is satisfied. For some applications, in order to determine whether to return "true" or "false," the method accesses one or more values external to the method, such as values stored in a context object. For example, the "expensive" and "inexpensive" methods in Listing 2 of Appendix A access the "amount" variable stored in the BPC-Context variable ctx (using a read method of the context).

An interaction name is satisfied if the name matches the descriptive name provided in the message received at step 112 that triggered the evaluation of the transition rules at step 116. In the example illustrated in Listing 2 of Appendix A, the first @Transition annotation of the @Transitions annotation of the waitForFirstApproval method includes the interaction "approved." If the descriptive name provided in the message is "approved," this interaction is triggered.

If, at a rule satisfaction check step 118, process engine 50 finds that all predicates and interaction names provided for a given @Transition have been satisfied, process engine 50 transitions to the next step in the process, by setting the current state equal to a state having the name indicated by the activity element of the triggered @Transition annotation, at a state transition step 120. The process engine effects this transition by returning to step 105, and calling the method having the name of the newly set state. If the message provided a payload (as described hereinabove at step 112), when calling this method the process engine passes the payload to the method as an argument. For example, the "rejected" method in Listing 2 of Appendix A receives such a payload as the "reason" argument (of type String).

Upon finding that a rule is satisfied, the process engine typically does not evaluate the remaining @Transition annotations listed in the @Transitions annotation. In the example illustrated in Listing 2 of Appendix A, the first @Transition annotation of the @Transitions annotation of the waitForFirstApproval method is triggered if the interaction name provided in the received message is "approved," and the predicate "inexpensive" is satisfied. Upon triggering of this transition, the current state is set to "order," and the order method is called at step 105. For some applications, the activity element specifies the name of a method provided by a class other than the process class including the annotation.

If, on the other hand, the process engine finds at check step 118 that no rules specified by any of the provided @Transition annotations have been satisfied, process engine 50 throws an exception, at a throw exception step 122, and the process is terminated. (For example, an exception may be thrown if a process is poorly annotated, or if a message received by the process engine is faulty.)

Reference is made to Listing 3 of Appendix A hereinbelow, which is a code listing showing an exemplary method for getting the descriptors of an @Annotations annotation, in accordance with an embodiment of the present invention. The static method fromAnnotation takes as arguments a Method and its @Transitions annotation, and returns an array of TransitionDescriptor. Each TransitionDescriptor includes the activity, predicate, and interaction of a single @Transition annotation.

In some embodiments of the present invention, techniques described herein that are implemented in software are at least in part run by an interpreter. Alternatively or additionally, at least a portion of such software is compiled into an executable form.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

APPENDIX A

Listing 1

```
import java.lang.annotation.Retention;
import java.lang.annotation.RetentionPolicy;
@Retention(RetentionPolicy.RUNTIME)
public @interface Process {
    String name( );
}
@Retention(RetentionPolicy.RUNTIME)
public @interface Initial {
}
@Retention(RetentionPolicy.RUNTIME)
public @interface Final {
}
@Retention(RetentionPolicy.RUNTIME)
public @interface Transition {
    String activity( );
    String predicate( ) default "";
    String interaction( ) default "";
}
@Retention(RetentionPolicy.RUNTIME)
public @interface Transitions {
    Transition[ ] transitions( );
    boolean wait( ) default true;
}
@Retention(RetentionPolicy.RUNTIME)
public @interface Activity {
    String name( );
}
```

Listing 2

```
@Process(name = "RequestApproval")
public class RequestApprovalProcess {
    private BPCContext ctx;
    public RequestApprovalProcess(int test) {
    System.out.println("Test is " + test);
    }
    @Initial
    @Transitions(wait = false, transitions = {
        @Transition(activity = "waitForFirstApproval")
    })
    public void requestInitiated(int amount) {
        ctx.store("amount", amount);
    }
    @Transitions(wait = true, transitions = {
        @Transition(activity = "order", interaction = "approved",
                    predicate = "inexpensive"),
        @Transition(activity = "additionalApprovalAsked",
                    interaction = "approved",
                    predicate = "expensive"),
        @Transition(activity = "waitForInfo",
                    interaction = "information-asked"),
        @Transition(activity = "rejected")
    })
    public void waitForFirstApproval( ) {
        System.out.println("Sending request for approval, amount = "
                    + ctx.read("amount"));
    }
```

APPENDIX A-continued

```
    public boolean inexpensive( ) {
        return ((Integer)ctx.read("amount")) <= 1000;
    }
    public boolean expensive( ) {
        return ((Integer)ctx.read("amount")) > 1000;
    }
    @Transitions(transitions = {
        @Transition(activity = "waitForAdditionalApproval")
    })
    public void additionalApprovalAsked( ) {
        System.out.println("Request approved");
        ctx.store("first-approval", Boolean.TRUE);
    }
    @Transitions(wait = true, transitions = {
        @Transition(activity = "order", interaction = "approved"),
        @Transition(activity = "waitForInfo",
                    interaction = "information-asked"),
        @Transition(activity = "rejected")
    })
    public void waitForAdditionalApproval( ) {
        System.out.println("Sending request for additional approval, 
                    amount = " + ctx.read("amount"));
    }
    @Transitions(wait = true, transitions = {
        @Transition(activity = "supplyItem",
                    interaction = "item-arrived"),
        @Transition(activity = "informUser",
                    interaction = "not-in-stock")
    })
    public void order( ) {
        System.out.println("Item ordered");
    }
    @Transitions(wait= true, transitions = {
        @Transition(activity = "infoArrived",
                    interaction = "information-arrived")
    })
    public void waitForInfo( ) {
        System.out.println("Waiting for more info");
    }
    @Transitions(transitions = {
        @Transition(activity = "waitForFirstApproval",
                    predicate = "notYetApproved"),
        @Transition(activity = "waitForAdditionalApproval",
                    predicate = "alreadyApprovedOnce")
    })
    public void infoArrived(String info) {
        System.out.println("Additional info received");
    }
    public boolean notYetApproved( ) {
        return ctx.read("first-approval") == null;
    }
    public boolean alreadyApprovedOnce( ) {
        return ctx.read("first-approval") != null;
    }
    @Final
    public void rejected(String reason) {
        System.out.println("Sorry, your request was rejected: "
                    + reason);
    }
    @Final
    public void informUser( ) {
        System.out.println("This item is not in stock");
    }
    @Transitions(wait = true, transitions = {
        @Transition(activity = "registerItem",
                    interaction = "item-supplied")
    })
    public void supplyItem( ) {
        System.out.println("Item has arrived");
    }
    @Final
    public void registerItem( ) {
        System.out.println("Item was registered");
    }
        public void setContext(BPCContext ctx) {
            this.ctx = ctx;
        }
}
```

APPENDIX A-continued

Listing 3

```
public class TransitionDescriptor {
    private String activity;
    private Method predicate;
    private String interaction;
    private TransitionDescriptor(String activity, String interaction,
                    Method predicate) {
        this.activity = activity;
        this.predicate = predicate;
        this.interaction = interaction;
    }
    public Method getPredicate( ) {
        return predicate;
    }
    public String getActivity( ) {
        return activity;
    }
    public String getInteraction( ) {
        return interaction;
    }
    public boolean holds(Message msg, Object obj)
            throws BPCExecutionException {
        if (!interaction.equals(msg.getName( )))
            return false;
        return holds(obj);
    }
    public boolean holds(Object obj) throws BPCExecutionException {
        try {
            boolean holds = false;
            if (predicate != null) {
                Object predicateResult = predicate.invoke(obj);
                if (predicateResult instanceof Boolean) {
                    holds = (Boolean)predicateResult;
                }
            } else { // predicate is null
                holds = true;
            }
            return holds;
        } catch (Exception e) {
            throw new BPCExecutionException("Error checking
                            condition", e);
        }
    }
    public static TransitionDescriptor[ ] fromAnnotation(Method
        method, Transitions annotation) throws BPCParseException {
        Transition[ ] transitions = annotation.transitions( );
        if (transitions == null)
            return null;
        List<TransitionDescriptor> descriptors =
            new LinkedList<TransitionDescriptor>( );
        for (Transition transition : transitions) {
            Method predicate = null;
            try {
                if (!"".equals(transition.condition( )))
                    predicate = method.getDeclaringClass( ).
                            getMethod(transition.condition( ),
                            new Class[ ]{ });
            } catch (Exception e) {
                throw new BPCParseException("Error parsing
                            transition", e);
            }
            String interaction = transition.interaction( );
            if ("".equals(interaction))
                interaction = transition.activity( );
            descriptors.add(new
                    TransitionDescriptor(transition.activity( ),
                    interaction, predicate));
        }
        return descriptors.toArray(new
                TransitionDescriptor[descriptors.size( )]);
    }
}
```

The invention claimed is:

1. A computer-implemented technique for executing a business workflow management process, comprising:
providing a class to a process engine executing on a processing management server, the process engine and the process class being implemented in an object-oriented programming language, the class having at least one annotation that defines at least a portion of a business workflow management process, the process comprising user interactions with distributed services, wherein the annotation is a run-time-readable, non-executable declarative programming construct that is associated with a first method of the class, and specifies at least one transition rule and a second method of the class associated with the transition rule;
executing the first method and the second method of the process class by parsing the annotation to extract the transition rule;
receiving a message at the process engine from a source external to the process engine;
evaluating, by the process engine, whether the transition rule is satisfied, responsively to the message; and
upon finding that the transition rule is satisfied, invoking the second method by the process engine, so as to generate an output with respect to the message.

2. The technique according to claim 1, wherein receiving the message comprises:
waiting for the message to arrive; and
evaluating whether the transition rule is satisfied after the message arrives.

3. The technique according to claim 1, wherein the transition rule specifies an interaction name, wherein parsing comprises extracting the interaction name from the transition rule, wherein receiving the message comprises extracting a descriptive name from the message, and wherein evaluating comprises comparing the interaction name to the descriptive name.

4. The technique according to claim 1, wherein the transition rule specifies a predicate, wherein parsing comprises extracting the predicate from the transition rule, and wherein evaluating comprises evaluating whether the predicate is satisfied.

5. The technique according to claim 4, wherein evaluating whether the predicate is satisfied comprises calling a third method of the class having a method name specified by the predicate, and evaluating a value returned by the third method.

6. The technique according to claim 1, wherein the annotation specifies a plurality of transition rules, and wherein evaluating comprises evaluating whether at least one of the plurality of transition rules is satisfied, responsively to the message.

7. The technique according to claim 1, wherein the annotation includes a first annotation, wherein the transition rule is specified by a second annotation, and wherein providing the class comprises providing the class having the first annotation that specifies the transition rule by including the second annotation as an element of the first annotation.

8. The technique according to claim 1, wherein invoking the second method comprises invoking the second method so as to send the output to the source external to the process engine.

9. The technique according to claim 1, wherein the process includes a business transaction, and wherein evaluating comprises storing a state of the business transaction, and evaluating whether the transition rule is satisfied responsively to the message and the state.

10. The technique according to claim 1, wherein invoking the second method to generate the output comprises invoking the second method to generate the output that invokes a service external to the process engine.

11. The technique according to claim 1, wherein parsing the annotation comprises parsing the annotation at run time.

12. The technique according to claim 11, wherein parsing the annotation at run time comprises using reflection to extract the transition rule.

13. Apparatus for executing a process, comprising a process management server that comprises:
an input interface for receiving a message from a source external to the process management server; and
a processor, which is configured to implement a process engine that is configured to execute a business workflow management process that includes user interactions with distributed services using a code listing, the code listing and the process engine being implemented in an object-oriented programming language, and to load a class that is defined in the listing, the class having at least one annotation that defines at least a portion of the process, wherein the annotation is a run-time-readable, nonexecutable declarative programming construct that is associated with a first method of the class, and specifies at least one transition rule and a second method of the class associated with the transition rule, and wherein the process engine is not an instance of the class, execute the first method and the second method of the class by parsing the annotation to extract the transition rule, evaluate whether the transition rule is satisfied, responsively to the message, and upon finding that the transition rule is satisfied, invoke the second method, so as to generate an output with respect to the message.

14. The apparatus according to claim 13, wherein the transition rule specifies an interaction name, and wherein the process engine is configured to extract the interaction name from the transition rule, extract a descriptive name from the message, and evaluate whether the transition rule is satisfied by comparing the interaction name to the descriptive name.

15. The apparatus according to claim 13, wherein the transition rule specifies a predicate, and wherein the process engine is configured to extract the predicate from the transition rule, and evaluate whether the transition rule is satisfied by evaluating whether the predicate is satisfied.

16. The apparatus according to claim 13, wherein the process includes a business transaction, and wherein the process engine is configured to store a state of the business transaction, and evaluate whether the transition rule is satisfied responsively to the message and the state.

17. A computer software product for executing a process, the product comprising a non-transitory computer-readable medium in which program instructions are stored, which instructions, when read by a computer, cause the computer to execute a business workflow management process that includes user interactions with distributed services using a code listing, and to implement a process engine that loads a class that is defined in the listing, the class having at least one annotation that defines at least a portion of the process, wherein the code listing and the process engine are implemented in an object-oriented programming language, and the annotation is a run-time-readable, non-executable declarative programming construct that is associated with a first method of the class, and specifies at least one transition rule and a second method of the class associated with the transition rule, and wherein the process engine is not an instance of the class;
executes the first method and the second method of the class by parsing the annotation to extract the transition rule;
receives a message from a source external to the process engine;
evaluates whether the transition rule is satisfied, responsively to the message; and
upon finding that the transition rule is satisfied, invokes the second method, so as to generate an output with respect to the message.

18. The product according to claim 17, wherein the transition rule specifies an interaction name, and wherein the instructions cause the process engine to extract the interaction name from the transition rule, extract a descriptive name from the message, and evaluate whether the transition rule is satisfied by comparing the interaction name to the descriptive name.

19. The product according to claim 17, wherein the transition rule specifies a predicate, and wherein the instructions cause the process engine to extract the predicate from the transition rule, and evaluate whether the transition rule is satisfied by evaluating whether the predicate is satisfied.

20. The product according to claim 17, wherein the process includes a business transaction, and wherein the instructions cause the process engine to store a state of the business transaction, and evaluate whether the transition rule is satisfied responsively to the message and the state.

* * * * *